Pitcher & Ellwood,
Plow Coulter.
No. 85,957.  Patented Jan. 19, 1869.
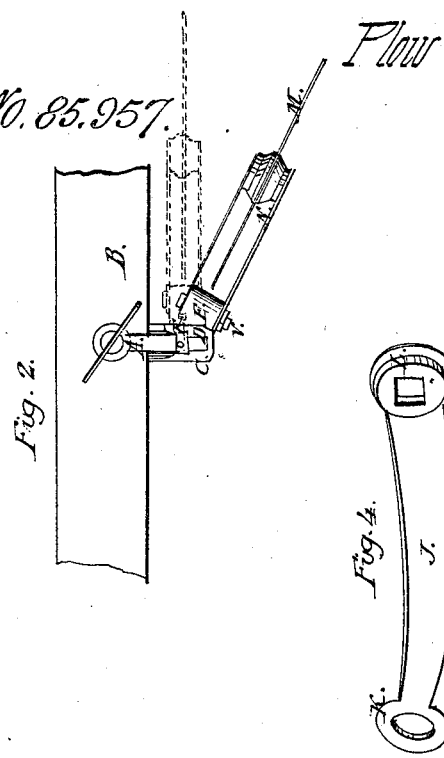
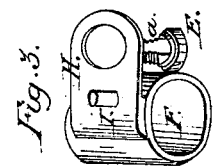
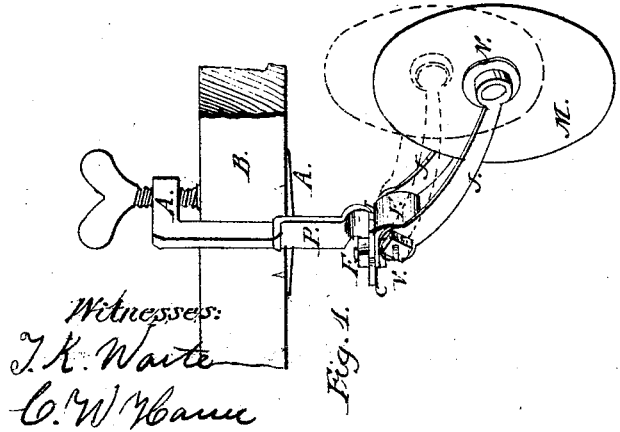
Witnesses:
J. K. Waite
C. W. Hauss
Inventor:
N. d. Pitcher
R. Ellwood
by G. L. Chapin
Atty.

R. L. PITCHER AND R. ELLWOOD, OF SYCAMORE, ILLINOIS.

Letters Patent No. 85,957, dated January 19, 1869.

IMPROVEMENT IN REVOLVING COULTER.

The Schedule referred to in these Letters Patent and making part of the same.

*To all whom this may concern:*

Be it known that we, R. L. PITCHER and R. ELLWOOD, of Sycamore, in the county of De Kalb, and State of Illinois, have invented an Improvement in Revolving Coulters; and we do hereby declare that the following is a full, clear, and exact description of the same, reference being had to the accompanying drawings, and letters marked thereon, making a part of this description, in which—

Figure 1 is a perspective representation of our invention, as it is attached to a plow-beam, and in position for use.

Figure 2, a plan or top view of the same.

Figure 3, an enlarged view of the cylindrical joint, by means of which the coulter has a partial revolution in a vertical and horizontal plane.

Figure 4, an enlarged view of one of the arms which support the coulter.

The nature of the present invention consists in the use of a cylindrical joint, which is so constructed and arranged that the arms which it supports may be adjusted and hold the coulter in position to run any required depth in the ground, and in pivoting the cylindrical joint to a slotted plate projecting out from the clamp, with which the device is fastened to the plow-beam, whereby the coulter may be set to or from the plow, as the case may require.

To enable others to fully comprehend the construction of our invention, we have marked like parts with like letters, and will now give a detailed description.

A A represent a screw-clamp, which is used to fasten our device to the plow-beam B, and which has a shank, P, projecting downward, and terminating in a horizontal bar or support, C, through which is made a slot, D, fig. 2, to receive a bolt, E, figs. 1 and 2, with which a cylindrical joint, F, is so held in position as to turn in a horizontal plane, said slot permitting the bolt to move longitudinally with the bar C, and to and from the beam B, when the coulter is to be adjusted.

The cylinder F is made of metal or other suitable material, and the plate H, which is rigidly attached to it, operates on the under side of the plate C, and has a hole made through, of suitable size to receive the shoulder $d$ of the bolt E, and thus allow the bolt to clamp the plate C, and yet permit the plate H to turn.

J J are arms, to which the coulter M is pivoted at N, and which have flanges, L, at the other ends, (as shown at fig. 4,) fitting into the ends of the cylinder F, and holes are made through them, to receive a bolt, $v$, figs. 1 and 2, by means of which the arms are clamped to the cylinder F.

The coulter M is prevented from turning too far on the bolt E by means of a stop or projection, I, figs. 1 and 3, which is rigidly fastened to the upper side of the plate H, and strikes against the edge of the plate C, when the coulter is swung out from the beam, as shown at fig. 2.

The coulter may be set to or from the beam by loosening a nut on the bolt E, and tightening it after the bolt has been moved to the proper position in the slot D; and the coulter M can be adjusted to run any required depth in the ground, by raising or lowering the arms J, as the case may require, and afterward clamping them firmly to the cylinder F by means of a nut and bolt, $v$.

Having thus fully described our invention,

What we claim, and desire to secure by Letters Patent of the United States, is—

1. The clamp A A, terminating in a slotted plate, C, in combination with the cylinder F, bolt E, and plate H, arranged to adjust the coulter laterally, as herein described.

2. The cylinder F, plate H, having the stop I, arms J, and plate C, arranged to adjust the coulter M laterally and vertically, substantially as set forth.

R. L. PITCHER.
R. ELLWOOD.

Witnesses:
HENRY R. JONES,
CHAS. W. HOWE.